United States Patent [19]

Graves

[11] Patent Number: 5,456,064

[45] Date of Patent: Oct. 10, 1995

[54] METHOD AND APPARATUS FOR PRODUCING AN INERT GAS

[75] Inventor: Albert Graves, Edmonton, Canada

[73] Assignee: Inert Gas Services Inc., Edmonton, Canada

[21] Appl. No.: 264,445

[22] Filed: Jun. 23, 1994

[51] Int. Cl.[6] .................................................. F01N 3/20
[52] U.S. Cl. ............................. 60/276; 60/281; 60/315; 423/212
[58] Field of Search ........................... 60/274, 281, 315, 60/276; 423/212, 245

[56] References Cited

U.S. PATENT DOCUMENTS 3,464,801  9/1969  Barstow ................................ 60/281
3,579,308  5/1971  Gower ................................. 60/281
3,905,773  9/1975  Brooks ................................. 60/276

FOREIGN PATENT DOCUMENTS 2424064  1/1978  Germany.

Primary Examiner—Douglas Hart
Attorney, Agent, or Firm—Anthony R. Lambert

[57] ABSTRACT

A method and apparatus for producing an inert gas is described. Firstly, capture the exhaust from a gas fired internal combustion engine located on the site of an intended application. Secondly, pass the exhaust stream through at least one catalytic converter. Thirdly, cool the exhaust stream passing from the catalytic converter to a temperature that will not harm a gas compressor. Fourthly, pass the exhaust stream into the gas compressor and apply the compressed exhaust stream exiting the compressor directly to the intended application.

3 Claims, 1 Drawing Sheet

METHOD AND APPARATUS FOR PRODUCING AN INERT GAS

The present invention relates to a method and apparatus producing an inert gas.

BACKGROUND OF THE INVENTION

Inert gases are used extensively in the food industry to prevent the decaying of foodstuffs, and in other industries to reduce the possibility of instantaneous combustion or explosive ignition. One method and apparatus for producing an inert gas is through the combustion of liquid or gaseous hydrocarbons. The greatest problem experienced with these methods and apparatus is in ensuring that the oxygen content is sufficiently reduced. Too high an oxygen content destroys the utility of the inert gas. Elaborate systems have been developed relating to using atomizing agents to promote more efficient combustion and a series of shock coolings and scrubbings to reduce the oxygen content. An example of such a system is German Patent 2,424,064. As a result of the elaborate systems which must be used to produce a safe inert gas, the cost of production is high and the apparatus required are not readily transportable for use at remote sights.

SUMMARY OF THE INVENTION

What is required is method and apparatus for producing an inert gas which is comparatively simple, cost effective and transportable.

According to one aspect of the present invention there is provided a method of producing an inert gas which includes the following steps as will hereinafter be described. Firstly, capture the exhaust from a gas fired internal combustion engine located on the site of an intended application. Secondly, pass the exhaust stream through at least one catalytic converter. Thirdly, cool the exhaust stream passing from the catalytic converter to a temperature that will not harm a gas compressor. Fourthly, pass the exhaust stream into the gas compressor and apply the compressed exhaust stream exiting the compressor directly to the intended application.

With the method, as described above, it is not necessary to subject the exhaust gases to extensive cooling and scrubbing. It is only necessary to reduce the temperature of the exhaust gases, to a temperature that will not harm the gas compressor. The oxygen content in the exhaust gases is reduced as a result of passing through the at least one catalytic converter. It is preferred that the exhaust gases be passed through a catalytic converter assembly consisting of a series of catalytic converters.

According to another aspect of the invention there is provided an apparatus for producing an inert gas which includes a gas fired internal combustion engine having an exhaust outlet, a fuel control valve, and an ignition advance/retard control. A catalytic converter assembly is provided consisting of a series of catalytic converters. The catalytic converter assembly has an inlet and an outlet. The inlet is connected by a first conduit to the exhaust outlet of the gas fired internal combustion engine. A cooler and moisture scrubber is provided having an inlet and an outlet. The inlet is connected by a second conduit to the outlet of the catalytic converter assembly. A gas compressor is provided having an inlet and an outlet. The inlet is connected by a third conduit to the outlet of the cooler and moisture scrubber, and the outlet is connected by a fourth conduit to an intended application. At least one sensing means is positioned in at least one of the second conduit, the third conduit and the fourth conduit. A microprocessor is connected to the sensing means, the fuel control valve, and the ignition advance/retard control. The microprocessor receives data from the sensing means regarding oxygen content and adjusts the fuel control valve and the ignition advance/retard control to maintain an exhaust stream passing by the sensing means which is inert.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
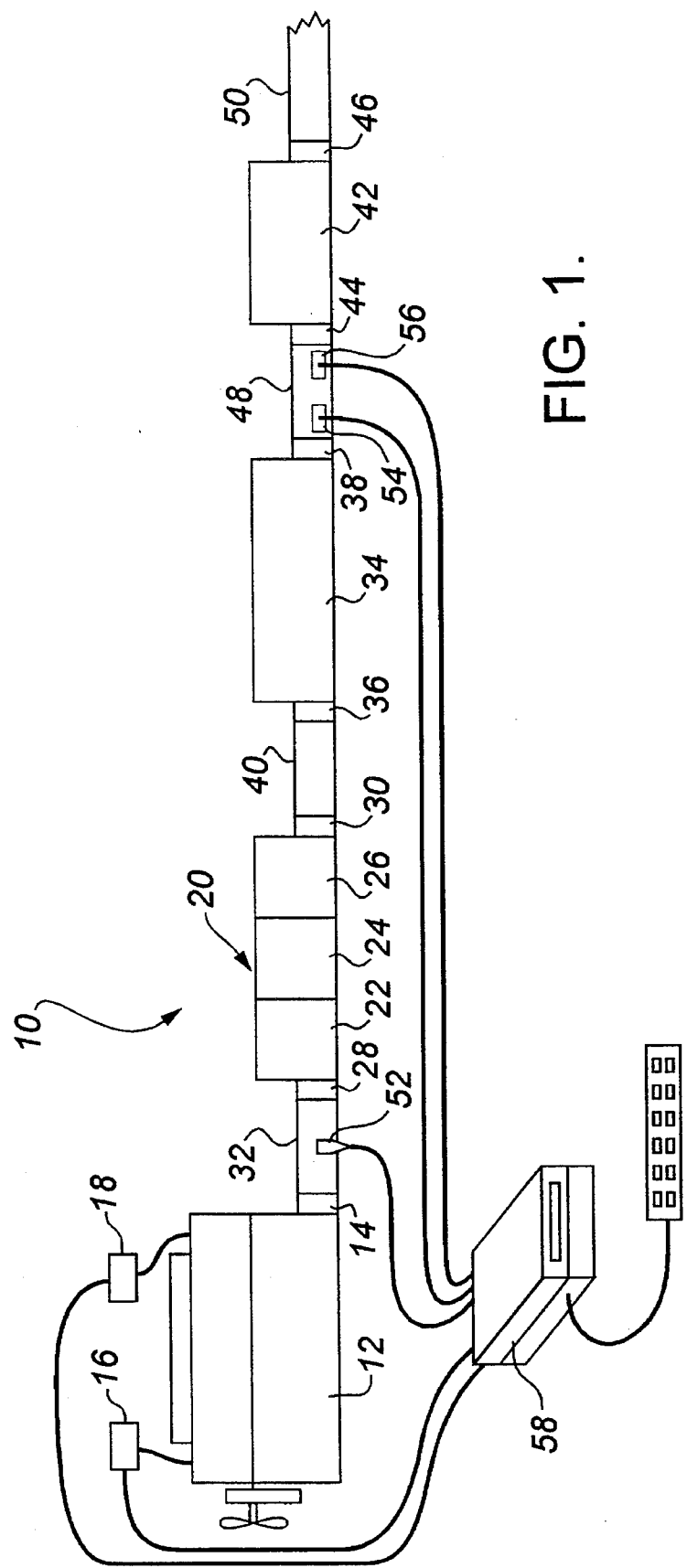
FIG. 1 is a block flow diagram showing an apparatus constructed in accordance with the teachings of the described method.

The preferred embodiment, an apparatus for producing an inert gas generally identified by reference numeral 10, will now be described with reference to FIG. 1.

Apparatus 10 includes a gas fired internal combustion engine 12 having an exhaust outlet 14, a fuel control valve 16, and an ignition advance/retard control 18. A catalytic converter assembly 20 is provided consisting of a series of catalytic converters 22, 24, and 26. Catalytic converter assembly 20 has an inlet 28 and an outlet 30. Inlet 28 is connected by a first conduit 32 to exhaust outlet 14 of gas fired internal combustion engine 12. A cooler and moisture scrubber 34 is provided having an inlet 36 and an outlet 38. Inlet 36 is connected by a second conduit 40 to outlet 30 of catalytic converter assembly 20. A gas compressor 42 is provided having an inlet 44 and an outlet 46. Inlet 44 is connected by a third conduit 48 to outlet 38 of cooler and moisture scrubber 34. Outlet 46 is connected by a fourth conduit 50 to an intended application (not shown). A sensor 52 is positioned in first conduit 32 leading from engine 12. Sensors 54 and 56 are positioned in third conduit 48 leading from cooler and moisture scrubber 34 to gas compressor 42. Sensor 52 monitors oxygen content. Sensor 54 monitors moisture content. Sensor 56 monitors the temperature of exhaust gas as it enters gas compressor 42. A microprocessor 58 is connected to sensors 52, 54, and 56, fuel control valve 16, and ignition advance/retard control 18. Microprocessor 58 receives data from sensors 52, 54, and 56 regarding oxygen content, moisture content and temperature and adjusts fuel control valve 16 and ignition advance/retard control 18 to maintain an exhaust stream passing by sensors 52, 54, and 56 which is dry, inert, and sufficiently cool that it will not harm gas compressor 42.

The use and operation of apparatus 10 in accordance with the preferred method will now be described with reference to FIG. 1. The first step involves capturing exhaust gases from gas fired internal combustion engine 12 located on a site of an intended application. This is accomplished by first conduit 32 channelling the exhaust gases from exhaust outlet 14 to inlet 28 of catalytic converter assembly 20. The second step involves passing the stream of exhaust gases through series of catalytic converters 22, 24, and 26 of catalytic converter assembly 20. In passing through catalytic converters the exhaust stream is stripped of any remaining oxygen, but it remains very hot. The third step involves cooling the stream of exhaust gases passing from catalytic converter assembly 20 to a temperature that will not harm gas compressor 42. This is accomplished by second conduit 40 channelling the hot exhaust gases from outlet 30 of catalytic converter assembly 20 to inlet 36 of cooler and moisture scrubber 34. The fourth step involves passing the stream of exhaust gases into gas compressor 42 and applying the compressed exhaust stream exiting outlet 46 of gas compressor 42 through fourth conduit 50 directly to the intended application. This is accomplished by third conduit 48 channelling the cooled exhaust gases from outlet 38 of cooler and moisture scrubber 34 to inlet 44 of gas compressor 42. It will be noted that in the apparatus 10 which is used to apply the intended method microprocessor 58 and sensors 52, 54, 56 are used to maintain a stream of exhaust gases entering gas compressor 42 that is consistently dry and inert.

It will be apparent to one skilled in the art that modifications may be made to the illustrated embodiment without departing from the spirit and scope of the invention as hereinafter defined in the claims. In particular, as catalytic converter technology improves it will become possible to reduce the number of catalytic converters required in the catalytic converter assembly or perhaps achieve an exhaust stream with the desired properties through the use of a single catalytic converter. Further, monitoring of the systems by the microprocessor may be achieved with alternate positioning of the sensors.

I claim:

1. An apparatus for producing an inert gas, comprising:
   a. a gas fired internal combustion engine having an exhaust outlet, a fuel control valve, and an ignition advance/retard control;
   b. a catalytic converter assembly consisting of at least one catalytic converter, the catalytic converter assembly having an inlet and an outlet, the inlet being connected by a first conduit to the exhaust outlet of the gas fired internal combustion engine;
   c. a cooler and moisture scrubber having an inlet and an outlet, the inlet being connected by a second conduit to the outlet of the catalytic converter assembly;
   d. a gas compressor having an inlet and an outlet, the inlet being connected by a third conduit to the outlet of the cooler and moisture scrubber, and the outlet being connected by a fourth conduit to an intended application;
   e. sensing means in at least one of the first conduit, the second conduit, the third conduit and the fourth conduit, the sensing means including at least one oxygen sensor and at least one moisture sensor; and
   f. a microprocessor connected to the sensing means, the fuel control valve, and the ignition advance/retard control, the microprocessor receiving data from the oxygen sensor regarding oxygen content and adjusting the fuel control valve and the ignition advance/retard control to maintain an exhaust stream passing out the outlet of the compressor which is inert.

2. The apparatus for producing an inert gas as defined in claim 1, wherein the sensing means includes a temperature sensor.

3. An apparatus for producing an inert gas, comprising:
   a. a gas fired internal combustion engine having an exhaust outlet, a fuel control valve, and an ignition advance/retard control;
   b. a catalytic converter assembly consisting of a plurality of catalytic converters, the catalytic converter assembly having an inlet and an outlet, the inlet being connected by a first conduit to the exhaust outlet of the gas fired internal combustion engine;
   c. a cooler and moisture scrubber having an inlet and an outlet, the inlet being connected by a second conduit to the outlet of the catalytic converter assembly;
   d. a gas compressor having an inlet and an outlet, the inlet being connected by a third conduit to the outlet of the cooler and moisture scrubber, and the outlet being connected by a fourth conduit to an intended application;
   e. an oxygen sensor in the first conduit;
   f. a moisture sensor in the third conduit; and
   g. a microprocessor connected to the oxygen sensor, the moisture sensor, the fuel control valve, and the ignition advance/retard control, the microprocessor receiving data from the sensors and adjusting the fuel control valve and the ignition advance/retard control to maintain an exhaust stream passing out the outlet of the compressor which is dry and inert.

\* \* \* \* \*